US005840361A

United States Patent [19]
Theuer et al.

[11] Patent Number: 5,840,361
[45] Date of Patent: Nov. 24, 1998

[54] FRUCTAN-CONTAINING BABY FOOD COMPOSITIONS AND METHODS THEREFOR

[75] Inventors: Richard C. Theuer, Chesterfield, Mo.; Mary Beth Cool, Canajoharie, N.Y.

[73] Assignee: Beech-Nut Nutrition Corporation, St. Louis, Mo.

[21] Appl. No.: 838,673

[22] Filed: Apr. 9, 1997

[51] Int. Cl.$^6$ ..................................................... A23L 1/29
[52] U.S. Cl. ........................ 426/615; 426/518; 426/618; 426/629; 426/636; 426/801
[58] Field of Search ................................... 426/801, 615, 426/618, 629, 636, 518

[56] References Cited

U.S. PATENT DOCUMENTS

| | | |
|---|---|---|
| H847 | 11/1990 | White et al. . |
| 4,277,563 | 7/1981 | Kerkhoffs . |
| 4,283,432 | 8/1981 | Mitchell et al. . |
| 4,285,735 | 8/1981 | Mitchell et al. . |
| 4,421,852 | 12/1983 | Hoehn et al. . |
| 4,565,705 | 1/1986 | Snider . |
| 4,681,771 | 7/1987 | Adachi et al. . |
| 4,778,680 | 10/1988 | Hidaka et al. . |
| 4,865,852 | 9/1989 | Tamatani et al. . |
| 4,871,574 | 10/1989 | Yamazaki et al. . |
| 4,927,811 | 5/1990 | Quarles . |
| 4,971,815 | 11/1990 | Tamatani et al. . |
| 4,987,124 | 1/1991 | Speights et al. . |
| 5,032,579 | 7/1991 | Speights et al. . |
| 5,127,956 | 7/1992 | Hansen et al. . |
| 5,169,671 | 12/1992 | Harada et al. . |
| 5,204,137 | 4/1993 | Slimak . |
| 5,215,773 | 6/1993 | Yada et al. . |
| 5,258,195 | 11/1993 | Lohan . |
| 5,422,346 | 6/1995 | Mitchell et al. . |
| 5,425,961 | 6/1995 | Yatka et al. . |
| 5,433,962 | 7/1995 | Fischer et al. . |
| 5,439,893 | 8/1995 | Richards et al. . |
| 5,444,054 | 8/1995 | Garleb et al. . |
| 5,464,646 | 11/1995 | Huang et al. . |
| 5,490,997 | 2/1996 | Devine et al. . |

OTHER PUBLICATIONS

Gibson et al., Non–digestible oligosaccharides and bifidobacteria—implications for health, *International Sugar Journal,* 96(1150):381–387 (1994) (Abstract only).

Chepurnoi et al., Formation of hydroxymethylfurfural during storage and processing of some foods, *Voprosy Pitaniya,* 6:67–68 (1987) (Abstract only).

Teeuwen et al., Inulin: A Versatile Fibre Ingredient, *International Food Ingredients,* 5:10–14 (1992) (Abstract only).

Brown et al., Fermentation of milk by *Lactobacillus bifidus, Canadian Institute of Food Technology Journal,* 3(4):121–129 (1970) (Abstract only).

*Japanscan: Food Industry Bulletin,* 4(6):5 (1986) (Abstract only).

Ernst et al., Inulin in vegetable plants of the Compositae family, *Gartenbauwissenschaft,* 54(6):249–252 (1989) (Abstract only).

Kueppers–Sonnenberg, Baking tests with topinambour, *Gordian (West African Edition),* 9:(1623B)19–20 (1969) (Abstract only).

Topinambur–Branntwein et al., Topinambour brandy II. Gas chromatographic examination of commercial topinambour brandy, *Alkohol–Industrie,* 82(19):450–54 (1969) (Abstract only).

Rutherford et al., Effects of 2,4– and 3,5–dichlorophenoxyacetic acids on Jerusalem artichoke tuber tissue disks, *Phytochemistry,* 8(10):1859–1866 (1969) (Abstract only).

Topinambur–Branntwein et al., Topinambour–Brandy. I. Comparison of commercial topinambour–brandies, *Alkohol–Industrie,* 82(1):5–8 (1969) (Abstract only).

Kueppers–Sonnenberg, Baking experiments with topinambour (Jerusalem artichoke), *Gordian,* 68(1622):551–552 (1968) (Abstract only).

Mallett et al., Factors Affecting the Gut Microflora, *Role of the Cut Flora in Toxicity and Cancer,* 347–382.

Howie et al., Protective effect of breast feeding against infection, *Br. Med. J.,* 300:11–16 (1990).

Bouhnik et al., Effects of Bifidobacterium sp fermented milk ingested with or without inulin on colonic bifidobacteria and enzymatic activities in healty humans, *European Journal of Clinical Nutrition,* 50:269–273 (1996).

Modler et al., Bifidobacteria and Bifidogenic Factors, *Can. Inst. Food Sci. Technol. J.,* 23:29–41 (1990).

Gibson et al., Dietary Modulation of the Human Colonic Microbiota: Introducing the Concept of Prebiotics, *J. Nutr.,* 125:1401–1412 (1995).

Jason et al., Mortality and Infectious Disease Associated with Infant–Feeding Practices in Developing Countries, *Pediatrics,* 74 (suppl):702–727 (1984).

Langhendries et al., Effect of a Fermented Infant Formula Containing Viable Bifidobacteria on the Fecal Flora Composition and pH of Healty Full–Term Infants, *J. of Ped. Gastroenterol. Nutr.,* 21:177–181 (1995).

Pipes et al., Nutrient Needs of Infants and Children, *Nutrition in Infancy and Childhood,* 30–58 (1993).

Beal, On the acceptance of solid foods, and other food patterns, of infants and children, *Pediatrics,* 20:448–456 (1957).

Trahms, Factors that shape food patterns in young children, *Nutrition in Infancy and Childhood,* 181–194 (1993).

(List continued on next page.)

*Primary Examiner*—Helen Pratt
*Attorney, Agent, or Firm*—Howell & Haferkamp, L.C.

[57] ABSTRACT

A baby food composition is disclosed which contains one or more fructan-containing vegetables. The composition selectively stimulates colonic bifidobacteria in the infant. The fructan-containing vegetables can include, among others, Jerusalem Artichoke, Salsify, Burdock and mixtures thereof. The baby food compositions can be a mixed vegetable preparation that includes at lease one fructan-containing vegetables along with other vegetables or baby food preparations. Also disclosed are methods for using and methods for preparing the baby foods.

30 Claims, No Drawings

OTHER PUBLICATIONS

Silverberg, Constipation, *Pediatric Gastroenterology*, 247–254 (1982).

Tomomatsu, Health Effects of Oligosaccharides, *Food Technology*, 48:61–65 (1994).

Ashbrook et al., Infants' Acceptance of Strong– and Mild–Flavored Vegetables, *J. Nutrition Ed.*, 17:5, 6, 46 (1985).

Stone et al, Affective Testing, *Sensory Evaluation Practices*, 58–86 (1985).

Stone et al., Affective Testing, *Sensory Evaluation Practices*, 227–252 (1985).

Brooks, It's Goo, Goo, Goo, Goo Vibrations at the Gerber Lab, *The Wall St. J.*, A1 (Dec. 4, 1996).

Brooks, Gerber Finds Baby Talk Useful, *The Wall St. J.*, A6 (Dec. 4, 1996).

Lawless, Sensory development in children: Research in taste and olfaction, *Am. Diet. Ass'n.*, 85:577–585 (1985).

Rosenstein et al., Differential Facial Responses to Four Basic Tastes in Newborns, *Child Develop.*, 59:1555–1568 (1988).

Kajiura et al., Early Developmental Change in Bitter Taste Responses in Human Infants, *Developmental Psychobiol.*, 25(5):375–386 (1992).

Lowenberg, Development of Food Patterns in Young Children, *Nutrition in Infancy and Childhood*, 165–180 (1995).

Rumessen et al., Fructans of Jerusalem artichokes: intestinal transport, absorption, fermentation, and influence on bood glucose, insulin, and C–peptide responses in healty subjects, *Am. J. Clin. Nutr.*, 52:675–681 (1990).

Gibson et al., Bifidogenic properties of different types of fructo–oligosaccharides, *Food Microbiology*, 11:491–498 (1994).

Roberfroid et al., The Biochemistry of Oligofructose, a Nondigestible Fiber: An Approach to Calculate Its Caloric Value, *Nutrition Reviews*, 51:137–146 (1993).

Gibson et al., Selective Stimulation of Bifidobacteria in the Human Colon by Oligofructose and Inulin, *Gastroenterology*, 108:975–982 (1995).

Wang et al., Effects of the in vitro fermentation of oligofructose and inulin by bacteria growing in the human large intestine, *J. Applied Bacteriology*, 75:373–380 (1993).

Farmer, two recipes, *The Original Boston Cooking–School Cook Book*, (1986).

*University of California Specialty and Minor Crops Handbook*, SMC–030 (1991).

Duke, Eat Your Weedies, *Organic Gardening*, 31–35 (Jul.–Aug., 1994).

FRUCTAN-CONTAINING BABY FOOD COMPOSITIONS AND METHODS THEREFOR

BACKGROUND OF THE INVENTION (1) Field of the Invention

This invention relates generally to infant foods and, more particularly, to novel baby food compositions comprising fructan-containing vegetables and to methods of making and using the compositions.

(2) Description of the Related Art

In human infants as is the case for adults, the colon accommodates a complex microbial ecosystem containing a large number and variety of bacteria. This community of microflora can play a major role in the health of the infant. For example, detrimental microbes may cause adverse conditions such as diarrhea and infections such as gastroenteritis. On the other hand, beneficial microbes such as the Bifidobacterium species are thought to promote health by their fermentation of sugars present in the colon. This inhibits the development of putrefactive bacteria and provides resistance to infective gastroenteritis (Langhendries et al., *J Ped Gastroenterol Nutr* 21:177–181, 1995; Jason et al, *Pediatrics* 74(*suppl*):702–727, 1984; Howie et al., *Br Med J* 300:11–16, 1990 which are incorporated by reference). Stimulating the colonic bifidobacteria may also result in the enhancement of immune functions, the improving of digestion and absorption of essential nutrients, and the synthesis of vitamins. (Gibson et al. *J Nutr* 125:1401–1412, 1995 which is incorporated by reference).

Infants are devoid of intestinal flora at birth, however, as a result of contact with the mother during birth and subsequent breast feeding, the intestinal flora rapidly increases. Bifidobacteria dominate the infant colonic flora in both breast- and formula-fed infants, however, the formula-fed infants have about one-tenth to roughly the same the number of bifidobacteria as breast-fed infants. After weaning, the population of colonic flora tends to resemble that of an adult in which bifidobacteria are the third largest group of microbes. (Modler et al., *Can Inst Food Sci Technol J.* 23:29–41, 1990; Gibson et al, Id. which are incorporated by reference).

Because of the potential health benefits of bacteria such as bifidobacteria, it would be desirable to increase the number of these bacteria in the colon. One approach to increasing the colonic bifidobacteria in humans has been termed probiotics. This involves feeding live microbial supplements that beneficially affect intestinal microbial balance. Certain problems can be associated with this approach, however, in that the microbes may not remain viable in their transit through the upper gastrointestinal tract to the colon and in that the microbes may not be able to establish permanent colonies in the colon. Although the feeding of live bifidobacteria to infants has been reported to increase the number of these beneficial bacteria in the fecal flora during the period of administration, the bifidobacteria rapidly decline after the conclusion of the feeding period to levels below pre-feeding values (Langhendries et al., *J Ped Gastroenterol Nutr* 21:177–181, 1995; Bouhnik et al. *Eur J Clin Nutr* 50:269–273, 1996 which are incorporated by reference).

A second approach termed prebiotics involves feeding a nondigestible food ingredient that beneficially affects the microflora by selectively stimulating the growth and/or activity of beneficial bacteria. One group of nondigestible food ingredients that can act as prebiotics are the fructooligosaccharides. These are polymers of β-D fructosyl units having short length chains with a degree of polymerization of up to 9 (oligofructose) to medium-length chains with a degree of polymerization of up to about 60 (Inulin). These fructooligosaccharides are collectively referenced as fructans. The presence of oligofructose and its fermentation in vitro result in an increase in the number and metabolic activity of bifidobacteria (Wang et al, *J Appl Bacteriol* 75:373–380, 1993; Mallet et al. in *Role of the Gut Flora in Toxicity and Cancer*, pp. 347–382, Rowland, ed., London, Academic Press, 1988 which are incorporated by reference). Furthermore, the oral administration of fructans such as oligofructose and inulin have been shown to increase the number of bifidobacteria in stools when administered orally to humans (Gibson et al. *Gastroenterol* 108:975–982, 1995 which is incorporated by reference). As a result, fructans have been recommended as supplements to the diets of adult humans (Modler et al., supra which is incorporated by reference). Nevertheless, none of these earlier reports suggested administration of fructans to human infants. Furthermore, one problem with the utilization of refined fructans as prebiotics in infants is that the suitability of such preparations in baby food compositions has not been established.

Certain plant foods contain fructooligosaccharides and could, therefore, be potentially useful in beneficially affecting colonic function and metabolism (Roberfroid et al., *Nutr Rev* 51:137–146, 1993 which is incorporated by reference). Increasing the intake of foods such as onions, garlic, artichoke, chicory and asparagus has been suggested for producing a bifidogenic effect in the large bowel (Gibson et al. *Food Microbiol* 11:491–498, 1994 which is incorporated by reference). Nevertheless, many vegetables containing oligofructose are not suitable for use in a baby food composition in amounts necessary to provide a bifidogenic effect. For example, leek, onion, garlic and other plants of the Allium family are known to cause irritation, heartburn or acid indigestion and food allergies in sensitive individuals, as well as unique and negative stool odors. Furthermore, many of the vegetables have strong or undesirable flavors that are organoleptically unacceptable in a baby food composition. For example, chicory which has been used as a commercial source of fructans is known to have a strong bitter taste. Thus, there remains a continuing need to develop an acceptable approach for selectively stimulating beneficial colonic bacteria in infants and thereby contributing to infant health.

SUMMARY OF THE INVENTION

Accordingly, the inventors herein have succeeded in discovering that certain fructan-containing vegetables are suitable for incorporating into baby food compositions. The vegetables are organoleptically acceptable for use in a baby food composition. The new baby food compositions contain one or more of the vegetables in an amount that selectively stimulates and maintains beneficial colonic bifidobacteria upon feeding the compositions to infants. The baby food compositions are prepared in an acceptable baby-food formulation. The vegetable can be present in the composition in an amount that provides from about 1 to about 10 percent (w/w) fructan in the composition as prepared for consumption. Vegetables that are particularly applicable for use in the present invention comprise roots or tubers from certain members of the Compositae family. Because the baby food compositions of the present invention are comprised of fructan-containing vegetables the compositions are whole food preparations rather than supplemental additions of refined fructans to baby foods. Furthermore, many of the vegetables used in the present invention have been identified by the inventors herein as having a long history of use in human diets.

The present invention, in additional embodiments, is directed to baby food compositions comprising mixtures of one or more fructan-containing vegetables with one or more other vegetables. Such mixtures in addition to fructan-containing vegetables can include roots and tubers such as carrots from the family Umbelliferae and/or members of the legume families such as peas or green beans. Methods of making and using such mixtures are also within the scope of the present invention.

Another embodiment of the present invention is directed to a method for stimulating colonic bifidobacteria in an infant. The method comprises feeding to the infant a baby food composition comprising a fructan-containing vegetable in an amount suitable for selectively maintaining colonic bifidobacteria in the infant. The composition of the fructan-containing vegetable is in an acceptable baby-food formulation.

In another embodiment, the present invention is directed to a method for preparing a baby food composition. The method comprises pureeing a fructan-containing vegetable in an acceptable baby food formulation. The amount of fructan-containing vegetable present in the composition is such that ingestion of the composition by a human infant is capable of selectively stimulating and maintaining colonic bifidobacteria in the infant.

Among the several advantages achieved by the present invention, therefore, may be noted the provision of baby food composition that is capable of selectively stimulating and maintaining beneficial colonic bacteria; the provision of a method for improving the health of an infant by feeding the baby food compositions of the present invention; the provision of a method for inhibiting putrefactive bacteria thereby diminishing the malodorous character of infant stools; the provision of a method for making the baby food compositions having prebiotic properties; and the provision of compositions and methods based upon mixtures of vegetables conferring prebiotic properties with other desired vegetable.

DESCRIPTION OF THE PREFERRED EMBODIMENTS

The present invention is based upon the discovery that certain fructan-containing vegetables can be advantageously incorporated into baby food compositions. The term baby or infant as used herein is intended to mean a child in the first period of life generally considered to be in the age range of from birth to about four years. The term vegetable plant as used herein refers to an edible food plant. The term vegetable refers to that portion of the plant that is edible and for which the plant is grown. It is intended that all edible food plants and edible portions thereof be encompassed by these terms including herbaceous plants and their edible parts, fruit plants and the fruits thereof, and the like. The fructan-containing vegetables useful in the present invention have a number of properties that allows them to serve as components in a baby food composition. Such vegetables notably have a high concentration of fructans, i.e. oligofructose, having a degree of polymerization from 2 to 9 and/or inulin. Unless otherwise indicated, inulin is intended to refer a fructose oligosaccharide having a degree of polymerization of from 2 to about 60. The degree of polymerization can be measured by routine methods known in the art (see for example, Rumessen et al, *Am J Clin Nutr* 52:675–81, 1990 which is incorporated by reference). The fructose oligosaccharides of these vegetables serve as a preferred source of carbon and energy for colonic bifidobacteria compared to glucose. Furthermore, other bacteria normally resident in the human colon will generally show a preference toward utilization of glucose over the fructose oligosaccharides. (see for example, Gibson et al, *Food Microbiology* 11:491–198, 1994 which is incorporated by reference). Thus, the vegetables of the present invention have a prebiotic effect to selectively stimulate and maintain colonic bifidobacteria.

The vegetables suitable for use in the present invention are those which contain high levels of fructans. Particularly suitable for use in the present invention are vegetables which are fructan-containing roots or tubers of members of the Compositae family, sometimes termed the Sunflower family. Members of this family include, but are not limited to artichoke, camomile, chicory, dahlia, dandelion, endive, Jerusalem artichoke, escarole, lettuce, salsify, safflower, sunflower, tansy and tarragon. The amount of total fructans in the vegetables useful in the present invention is preferably at least about 1%, more preferably at least about 3%, and most preferably at least about 5%. A survey of literature on some of the members of the Compositae family has reported the fructan content to range from between about 3 and about 11 percent for Salsify and Globe Artichoke to between about 15 and about 20 percent for Jerusalem Artichoke and Chicory root (Roberfroid et al, *Nutr Rev* 51:137–146, 1993 which is incorporated by reference). It will be understood by those skilled in the art that the amount of fructan in a particular vegetable will depend upon a number of factors including the species and variety as well as the cultivation and harvest conditions. Thus, the minimal values identified above are not intended to limit the present invention but instead to characterize what is generally considered as typical for a given vegetable.

In a preferred embodiment, the fructan-containing vegetable is incorporated into the baby-food preparation as a whole food. The whole food concept involves preparation such as by cleaning, peeling and comminuting the whole food or part thereof as distinguished from further processing such as by drying, milling into a flour and/or further refining. In another embodiment, the fructan-containing vegetable can be first dried and milled into a flour and then added to the baby food.

It is also preferable, although not essential, that the vegetable have a history of being consumed in the human diet. Such prior use provides a basis for the safe addition to the diet thereby increasing the likelihood of acceptance of the vegetable in a baby food composition. Vegetables that have been consumed in the diet include, for example, Jerusalem artichoke, globe artichoke, dandelion, chicory, salsify and burdock.

The vegetable must also be organoleptically suitable for incorporation into a baby food composition. Infants are known to display an aversion to bitter tastes at a very early age (Trahms, in *Nutrition in Infancy and Childhood*, Pipes and Trahms, Eds, Mosby, St. Louis, 1993, pp. 181–194; Kajiura et al, *Developmental Psychobiol* 25:375–386; Rosenstein et al., *Child Develop* 59:1555–1568, 1988 which are incorporated by reference). Furthermore, it has been shown that children respond to bitter tastes in much the same way as adults (Lawless, *Am Diet Ass'n* 85:577–585, 1985 which is incorporated by reference). Thus, a food product having a strong bitter taste would not be acceptable in a baby food composition. Assessment of the bitterness level to determine which fructan-containing vegetables are suitable for use in a baby food can be performed by the skilled artisan using routine experimentation such as that disclosed in Example 7 below. Because the adult perception of bitter tastes closely follows that in the infant, it is possible to conduct such testing in adults (Id.). Furthermore, food preferences or aversions of the adult caring for the infant are known to influence which foods are offered to the infant (Trahms, supra; Brooks, *The Wall St J*, Dec. 4, 1996 pp A1, A6 which are incorporated by reference). Standard testing procedures for sensory evaluation are known in the art (see, for example, Stone and Sidel in *Sensory Evaluation Practices*, Academic Press, Orlando, 1985, pp 58–86, 227–252 which is incorporated by reference).

Infants also tend to reject or at least show a diminished acceptance of strong flavors and, in particular strong-flavored vegetables (Lowenberg, in *Nutrition in Infancy and Childhood*, Pipes and Trahms, Edds, Mosby, St. Louis, 1993, pp. 165–180; Brooks, supra; Lawless, supra; Ashbrook et al, *J Nutrition Ed* 17:5, 6, 46, 1985; Beal *Pediatrics* 20:448–456, 1957 which are incorporated by reference). Therefore, vegetables suitable for use in a baby food composition, preferably, do not have a strong flavor. The testing of vegetables for the presence of strong flavors can also be readily performed by the skilled artisan using routine methods (Stone and Sidel, supra which is incorporated by reference).

Testing for organoleptic acceptability could, for example, be performed in infants after obtaining informed consent from parents in a double-blind, randomized controlled study. Infants of ages from about 4 months to about 12 months would be fed a series of baby food composition prepared with a particular fructan-containing vegetable or a baby food composition that includes a standard vegetable normally used in baby food preparations and known to be accepted by the infants such as, for example, carrots. The adult feeding the infant would then record acceptability and tolerance including amount offered, amount consumed and amount refused by the babies as well as the number, color and consistency of stools. Acceptability rating would be performed by methodology known in the art (for example, Stone and Sidel, *Sensory Evaluation Practices*, Academic Press, Inc., Orlando, 1985, pp. 58–86 which is incorporated by reference). The results would be analyzed and vegetable compositions showing acceptance comparable to or greater than that of the standard vegetable would be considered suitable for use as an infant food.

The prebiotic effect of the fructans of the present invention in stimulating or maintaining colonic bifidobacteria as referenced herein includes an increase in the number of colonic bifidobacteria and/or an increase in the percent of bifidobacteria with respect to total bacteria in the colon and/or an increase in the metabolic activity of the colonic bifidobacteria so long as the stimulating or maintaining action is capable of providing a selectivity for the growth and metabolism of bifidobacteria over other colonic bacteria. Such selectivity can result in a preferential fermentation of colonic contents by the bifidobacteria compared to non-bifidobacteria colonic microbes such as, for example, enterobacteriaceae or bacteroidaceae which have been reported to produce potentially toxic fermentation products (Tomomatsu, *Food Technology* 48:61–65, 1994 which is incorporated by reference).

In order to achieve the desired beneficial effect of stimulation and/or maintenance of bifidobacteria, an effective amount of fructans are present in the baby food composition of the present invention. Preferably the fructan-containing vegetable is present in the composition in sufficient quantity to yield from about 1% to about 10% (w/w) fructan having a degree of polymerization within the range of 2 to about 60, in the overall composition. The amount of the fructan-containing vegetable needed in the final baby food composition can be readily determined from the amount of fructan in the vegetable and the desired amount of fructan in the final baby food composition. For a particular preparation, the percent fructan in the final composition will depend upon a number of factors including the intended daily consumption of fructan, the unit amount of baby food composition such as is contained in a standard commercial jar of baby food as well as the intended relative proportion of the daily diet for the particular baby food composition. One skilled in the art can readily determine the desired effective amount of the fructan-containing vegetable in a particular baby food composition with no more than routine experimentation based upon the amounts of oligofructose and inulin known to be effective in adults (for example, see Gibson et al, *Gastroenterol* 108:975–982, 1995 which is incorporated by reference).

In determining the amount of fructan needed to elicit a stimulating and/or modulating effect on bifidobacteria calculations can be based upon amounts known to be effective in humans. For example, Gibson et al, (supra, 1995) has shown that 15 grams of either oligofructose or inulin per day increases bifidobacteria count in feces. Both the daily caloric intake and fecal mass of infants are about one-fifth to one-third that of adults (Pipes et al. in *Nutrition in Infancy and Childhood*, Pipes and Trahms, Eds, Mosby, St. Louis, 1993, pp. 30–58; Gibson et al., supra, 1995; Silverberg in *Pediatric Gastroenterology*, Silverberg, ed., Med Exam Pub Co., N.Y., 1982 which is incorporated by reference). Therefore, it is estimated that an amount effective in human infants is approximately 3–5 grams of fructans per day. A typical jar of commercial baby food for six-month infants contains four ounces or 113 grams of baby food composition. Four grams of fructans added to 113 grams of baby food composition would amount to approximately 3–4 percent w/w.

Moreover, no more than routine experimentation would be required to determine the effect of a baby food composition comprising a fructan-containing vegetable on colonic bifidobacteria. For example, after obtaining informed consent for parents of the babies a double-blind, randomized controlled study could be performed. Two groups each including about 10 full-term infants of ages from about 4 months to about 12 months would be fed either a baby food composition which does not include a fructan-containing vegetable or a baby food composition that includes the fructan-containing vegetable having a known content of fructan. Before, during and after the conclusion of a period of time in which the fructan-containing vegetable is included in the infants diet fecal samples would be obtained and fecal flora composition and stool pH would be determined using procedures known in the art (for example, Langhendries et al., *J Ped Bastroenterol Nutr* 21:177–181, 1995; Gibson et al., *Gastroenterol* 108:975–982, 1995; Holdeman et al, eds. *Anaerobic Laboratory Manual*, 4th ed. Blacksburg, Va.: VPI Anaerobe Laboratory, 1977; Munoa et al., *Appl Environ Microbiol* 54:1715–1718, 1988; Macfarlane et al, *J Appl Bacteriol* 66:407–417, 1989; Mevissen-Verhage et al, *J Clin Microbiol* 25:285–289, 1987 all of which are incorporated by reference). Statistical analyses would then be performed on the resulting data comparing differences between the two groups.

The compositions of the present invention are in acceptable baby food formulations. The formulations may contain certain additional additives that are preferably naturally derived including, for example, water, fillers such as corn starch, rice starch, rice flour, wheat flour, nonfat dry milk and the like, nutritional supplements such as vitamins and minerals and flavoring agents such as salt, onion powder and the like. In certain embodiments, coloring agents, processing agents or preservative agents can be incorporated into the composition such as, for example, to improve color, taste, shelf life and the like. Preferably, the formulation is based upon a whole food concept such that individual constituents conferring the desired properties on the composition are prepared foods rather than dried and/or refined substances or artificially prepared substances. The whole foods are prepared such as by cleaning, peeling and comminuting the whole food or part thereof. Examples of whole food components of baby food compositions are light fleshed vegetables such as white carrots which can be used as fillers instead of a starch substance (see, for example, copending application Ser. No. 08/604,616, now U.S. Pat. No. 5,723, 166, which is incorporated by reference).

A baby food formulation will also have a texture that is acceptable to the baby such as soft and homogenous. For older infants an inhomogenous texture may be desired. Certain textures such as a grittiness are in general less desirable. Preferably, the desired texture can be achieved using the whole food concept by mixing whole food preparations having the desired texture. Moreover, the color of the composition is such that the composition will not be rejected by the infant or the adult caregiver. Preferably, acceptable color is achieved using the whole food concept in which food components are added which produce the desired color for the overall mixture.

An acceptable formulation will also have properties such that the composition will be consumed by the infant. As noted above, the composition must be organoleptically acceptable. Moreover, the composition should not produce adverse side effects such as acid indigestion, diarrhea, allergic responses or the like.

The fructan-containing vegetable can be the sole vegetable component of the baby food composition or, alternatively, the fructan-containing vegetable can be in a mixture with one or more other vegetables or food constituents. In these mixtures, the fructan-containing vegetable confers prebiotic properties upon the mixture. Such other vegetables that can be incorporated into these mixtures can be obtained from vegetable plants which include, but are not limited to, members of the buckwheat family including buckwheat, rhubarb and sorrel; members of the Goosefoot family including beets, spinach and Swiss chard; members of the Gourd family including cantaloupe, casaba, cucumber, honeydew, pumpkin, summer squash, winter squash and watermelon; members of the grass family including barley, corn, hominy millet, oat, rice, rye, sorghum, sugar cane and wheat; members of the lily family including aloe, asparagus, chives, garlic, leek, onion, sarsaparilla and shallot; members of the mallow family including cottonseed, marshmallow and okra; members of the morning glory family including sweet potato; members of the mustard family including broccoli, brussel sprouts, cabbage, cauliflower, collards, garden cress, horseradish, kale, kohlrabi, mustard, radish, rutabaga, turnip and watercress; members of the nightshade family including bell pepper, cayenne pepper, paprika, eggplant, white potato and tomato; members of the parsley family including anise, caraway, carrot, celeriac, celery, coriander, dill, fennel, parsley and parsnip; and members of the pea or legume family including acacia, alfalfa, black-eyed pea, broad bean, carob bean, chick pea or garbanzo, common beans, green beans, lentil, licorice, lima been, mesquite, pea, peanut, tamarind and tragacanth. The mixed vegetable composition can be prepared by the skilled artisan using routine experimentation coupled with methods known in the art (see, for reference, Example 6 below). Methods for commercial production of compositions of combined vegetables are described in copending application Ser. No. 08/604,616 which is incorporated herein by reference.

Additional components of baby food compositions within the scope of the present invention can include, for example, pasta preparations, meat preparations such as turkey or beef, other protein foods, fruits and the like.

INDUSTRIAL APPLICATION

The baby food compositions of the present invention have application for use as semi-solid food preparations for infants. In addition, further benefits are provided by these baby food compositions. The increased levels of fructans in the food are expected to stimulate the growth of beneficial colonic bifidobacteria, i.e. increase the number and/or proportion and/or metabolic activity of colonic bifidobacteria in the infant consuming the composition. Furthermore, such stimulation is selective for the bifidobacteria over putrefactive bacteria. It is believed that the stools of infants consuming the composition would have a less offensive odor and that the stools of the older baby and toddler would smell more like that of a newborn and less like that of an adult. The stools are also expected to have a lower pH which would be expected to inhibit the development of putrefactive bacteria. This should diminish the likelihood of the infant developing gastroenteritis. Furthermore, diaper rash and perianal irritation would be expected to be lessened. Thus, the baby food compositions of the present invention would be expected to beneficially affect the fecal floral composition and pH and thereby contribute to the overall health of the infant.

Preferred embodiments of the invention are described in the following examples. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples.

EXAMPLE 1

This example illustrates the preparation of a Salsify composition.

Salsify is the name given to the edible root of three plant species: *Tragopogon porrifollus* (common salsify, also known as Oyster plant), *Scorzonera hispanica* (black salsify) and *Scolymus hispanicus* (Spanish oyster plant). Common salsify has a long history of use as a root vegetable in the United States; it is an ingredient in two recipes in Fanny Merritt Farmer's "The Original Boston Cooking-School Cook Book," published in 1896. Salsify is a minor commercial crop (University of California Specialty and Minor Crops Handbook, SMC-030 which is incorporated by reference) with at least one commercial cultivar (Mammoth Sandwich Island) available in North America.

Salsify or Oyster Plant seed of the Mammoth Sandwich Island cultivar was obtained from Nichols Garden Nursery, Albany, Oreg. The seeds were planted in sandy loam in Lewis County, New York, and in heavy clay soil in the spring in St. Louis County, Missouri. The crop was harvested in late October and November. The roots were not uniform in appearance. Some had straight attractive tapers, but others had forked roots, some of which grew at right angles to the vertical axis of the root, giving the root the appearance of an octopus. The attractive roots were of the general shape of small carrots of the Imperator or Chantenay types.

Product TK965: Salsify roots were rinsed with cold water to remove the surface dirt and allowed to drain. Ten pounds of roots were blanched at 200° F. for 5 minutes in 100 lb. of water to which 0.40 grams of ascorbic acid had been added. Ascorbic acid was added as a precaution, to help keep the salsify from turning brown. Old cookbooks recommend adding lemon juice or vinegar to or acidifying the water in which salsify roots are held.

The blanched roots were topped and then peeled in an abrasive peeler. The peeled roots were then trimmed manually and immediately placed in 100 lb. of water to which 0.4 grams of ascorbic acid had been added to retard darkening. The peeled salsify remained off-white to white in color. The roots were then drained and cooked in a pressure cooker at 15 psig for 5 minutes. The cooked salsify roots were then pureed, filled into four-ounce glass jars and the jars were capped. The capped jars were further processed in a conventional fashion and as further required by 21 C.F.R. §113 et seq. Thermally Processed Low-Acid Foods Packaged in Hermetically Sealed Containers, which is incorporated herein by reference. The processed puree had a greenish gray color and contained 16.5% total solids and 15.3% soluble solids as measured on the Brix scale.

Product TK966: Washed salsify roots were used directly without blanching. The raw, unblanched roots were topped and then peeled in an abrasive peeler. It was found that the raw roots peeled much better and did not require trimming. The peeled raw roots had a tan and pinkish color after peeling. The roots were then cooked in a pressure cooker at 15 psig for 5 minutes. The cooked salsify roots were then pureed, filled into four-ounce glass jars and the jars were capped. The capped jars were further processed in a conventional fashion and as further required by 21 C.F.R. §113 et seq. Thermally Processed Low-Acid Foods Packaged in Hermetically Sealed Containers, which is incorporated herein by reference. The processed puree had a greenish gray color similar to that of TK965.

EXAMPLE 2

The following example illustrates the preparation of a Burdock composition.

Burdock (*Arctium lappa*) is another commercially available edible root from the plant family Compositae. It is popular in Japan, where it has the name "Gobo." It is a very long (2 to 3 inches) slender root. Although used as a food substance, it has been suggested that burdock has undesirable taste components (Duke, *Organic Gardening*, July–August 1994, pp. 31–35 which is incorporated by reference).

Product TK971: Burdock roots of the variety *Arctium lappa* were purchased from Hyundai Korean Market, Creve Coeur, Mo. The roots were rinsed with cold water to remove surface dirt. Eleven pounds of roots were cut into segments approximately 8 inches in length and blanched at 200° F. for 5 minutes in 100 lb. of water to which 0.40 grams of ascorbic acid had been added. The blanch water turned green during this process. The white blanched root segments were trimmed and then peeled in an abrasive peeler. The peeled roots acquired a gray color. The peeled roots were then trimmed manually and immediately placed in 100 lb. of water to which 0.40 grams of ascorbic acid had been added to retard darkening. The roots were then drained and cooked in a pressure cooker at 15 psig for 5 minutes. The cooked burdock roots were then pureed, the puree was filled into four-ounce glass jars and the jars were capped. The capped jars were further processed in a conventional fashion and as further required by 21 C.F.R. §113 et seq. Thermally Processed Low-Acid Foods Packaged in Hermetically Sealed Containers, which is incorporated herein by reference.

In a preliminary analysis the raw burdock roots were found to contain 21% total solids whereas the processed puree was found to contain two-thirds of this value, i.e. 14% total solids.

EXAMPLE 3

The following example illustrates the preparation of a composition of Jerusalem Artichokes.

Jerusalem artichoke is the name given to the plant and the storage tubers of *Helianthus tuberosus*, a perennial sunflower. Jerusalem artichoke tubers are a native North American staple, described by Champlain in the 1600's on a visit to New France (Canada) and subsequently transported by him back to France in 1616, where substantially improved cultivars subsequently were commercially grown. Currently, most U.S. Federal agriculturists classify Jerusalem artichoke as a weed. It is impossible to harvest all of the tubers; the remaining tuber fragments make Jerusalem artichokes an endemic weed. Jerusalem artichoke tubers have many knobs that make them very difficult to clean efficiently without major waste. The tubers have a thin skin and must be maintained in a high humidity environment to prevent shriveling. The thin skin also makes harvesting difficult. These horticultural problems make Jerusalem artichokes an expensive vegetable to produce.

Product 912: Jerusalem artichokes, branded as "Frieda's sunchokes," were purchased in Von's Pavilion Market, Irvine, Calif. Ten pounds of tubers were cleaned with a scrubber and placed in 50 lb. of water containing 0.04% ascorbic acid. The raw tubers were then cut into chunks and cooked in a pressure cooker at 15 psig for 5 minutes. The cooked tubers were then pureed, the puree was filled into four-ounce glass jars and the jars were capped. The capped jars were further processed in a conventional fashion and as further required by 21 C.F.R. §113 et seq. "Thermally Processed Low-Acid Foods Packaged in Hermetically Sealed Containers," which is incorporated herein by reference.

In a preliminary analysis, the raw Jerusalem artichoke tubers were found to contain 10% sucrose and 24% total solids whereas, the processed puree was found to contain 9% sucrose and 18% total solids.

EXAMPLE 4

The following example illustrates the preparation of a composition of Chicory Root.

Chicory root is the storage organ of the plant *Cichorium intybus*. Chicory root is the source of virtually all commercial inulin and fructose oligosaccharides of natural origin. Chicory root has been used as a human food for at least two centuries. "Coffee chicory" (also called "Magdeburg chicory") is a chicory cultivar whose roasted root is a coffee substitute and coffee extender. In Italy, cooked chicory root is used directly as food, under the name "soncino." In France, digested chicory root is made into a sweetening syrup, the sweetening power being derived from the fructose liberated during digestion. Some chicory cultivars are grown for their roots, which are used to produce "Belgian endive."

Harvested when mature, these chicory roots are exposed to cold and then placed in a cool room. The edible "chicon" (the edible white salad leaves known as "Belgian endive") sprouts from the root. The spent roots are commonly fed as cattle feed. All species of the family Cichorium (e.g., Belgian endive, escarole, raddichio) are known for a characteristic bitterness in their edible portions.

Product TK921A: Harvested Witloof chicory roots that had not forced to produce Belgian endive (referred to hereinafter as "unspent" chicory roots) were obtained from California Vegetable Specialties, Rio Vista, Calif. Unspent roots were peeled in an abrasive peeler, the peeled roots were then trimmed and cut into small chunks, and the root chunks were then cooked in a pressure cooker at 15 psig for 5 minutes. The cooked root chunks were then pureed in a blender, with sufficient water added to give a puree with a satisfactory consistency. The puree was then filled into four-ounce glass jars and the jars were capped. The capped jars were further processed in a conventional fashion and as further required by 21 C.F.R. §113 et seq. Thermally Processed Low-Acid Foods Packaged in Hermetically Sealed Containers, which is incorporated herein by reference.

Product TK921B: Harvested Witloof chicory roots that had previously been forced to produce Belgian endive (referred to hereinafter as "spent" chicory roots) were obtained from California Vegetable Specialties, Rio Vista, Calif. Spent roots were peeled in an abrasive peeler, the peeled roots were then trimmed and cut into small chunks, and the root chunks were then cooked in a pressure cooker at 15 psig for 5 minutes. The cooked root chunks were then pureed in a blender, with sufficient water added to give a puree with a satisfactory consistency. The puree was then filled into four-ounce glass jars and the jars were capped. The capped jars were further processed in a conventional fashion and as further required by 21 C.F.R. §113 et seq. Thermally Processed Low-Acid Foods Packaged in Hermetically Sealed Containers, which is incorporated herein by reference.

EXAMPLE 5

The following example illustrates the analytical testing for sugars and inulin in the vegetable preparations of Examples 1–4.

Individual samples of the canned purees made with blanched salsify roots (Example 1, TK965), burdock (Example 2, TK971), Jerusalem artichokes (Example 3, TK912), unspent chicory roots (Example 4, TK921) and spent chicory roots (Example 5, TK921B) were submitted for analysis. Simple sugars, oligosaccharides and inulin were determined by an independent laboratory using AOAC method no. 97720 for simple sugars and high-pressure liquid chromatography with pulsed ampometric detection to estimate the amounts of specific fructose oligosaccharides and inulin. The results are shown in Table 1.

TABLE 1

| | Salsify TK965 | Burdock TK971 | J. artichoke TK912 | Unspent chicory TK921A | Spent chicory TK921B |
|---|---|---|---|---|---|
| Brix (soluble solids) | 14.0° | 11.9° | 17.0° | 12.2° | 4.8° |

TABLE 1-continued

| | Salsify TK965 | Burdock TK971 | J. artichoke TK912 | Unspent chicory TK921A | Spent chicory TK921B |
|---|---|---|---|---|---|
| | % by weight of the puree sample | | | | |
| Sugar | | | | | |
| glucose | 0.00 | 0.00 | 0.00 | 0.77 | 0.19 |
| fructose | 1.77 | 1.90 | 0.79 | 1.99 | 1.74 |
| sucrose | 0.89 | 1.19 | 4.19 | 2.03 | 0.82 |
| fructose oligosaccharides | | | | | |
| DP3 | 0.91 | 1.03 | 2.45 | 1.86 | 0.17 |
| DP4 | 0.75 | 0.98 | 2.01 | 2.44 | 0.15 |
| DP5 | 0.93 | 0.54 | 1.04 | 0.63 | 0.07 |
| DP6 | 1.01 | 0.82 | 0.44 | 0.77 | 0.09 |
| inulin | 9.33 | 5.58 | 5.38 | 4.47 | 0.46 |
| (DP7–DP22) total fructans | 12.92 | 8.95 | 11.33 | 10.17 | 0.94 |
| total carbohydrate | 15.58 | 12.04 | 16.31 | 14.96 | 3.69 |

EXAMPLE 6

This example illustrates the manner in which a mixed vegetable composition including salsify with orange carrots and peas would be prepared.

Ten pounds of orange carrots are cut into chunks and placed in a pressure cooker with ten pounds of frozen green beans. The vegetables are then cooked at 15 psig for 5 minutes. The cooked vegetables are then pureed with sufficient water to achieve a puree with a satisfactory consistency.

The salsify would be prepared as in Example 1, the total fructan content determined, and the relative amounts of mixed vegetables and salsify needed for the baby food composition calculated. For example, the TK965 preparation of salsify contained approximately 13% total fructans. Where the desired final baby food composition would contain 3–4% fructans, the mixture would, therefore, need to contain about 25% of the TK965 preparation. Thus, a selected amount of the TK965 preparation, such as for example one pound, would be mixed with a three-fold larger amount of the mixed vegetable puree such as, for example, three pounds. The mixture would then be placed in four-ounce glass jars which would then be capped. The capped jars would be further processed in a conventional fashion as required under 21 C.F.R. §113 et seq. Thermally Processed Low-Acid Foods Packaged in Hermetically Sealed Containers, which is incorporated herein by reference.

EXAMPLE 7

The following example illustrates the testing of fructan-containing vegetables for organoleptic acceptability.

Fourteen taste test panelists were selected based on their proven ability in repeated testing to distinguish among solutions of caffeine (bitter), citric acid (sour), salt and sugar (sweet). In the vegetable testing, parsley root and white carrot root were internal standards for the Compositae vegetables. These vegetables were prepared by cooking and pureeing the vegetables as described in Examples 1–5 and 7.

Under "blind" conditions, including red light illumination to minimize identification of samples, experimental samples of various vegetables were evaluated by these trained panelists for flavor and mouthfeel/texture on a standard nine-point Hedonic scale and for bitterness on a special nine-point ordinal scale. The two scales were as follows:

| Score/rating | Std. Hedonic Scale | Ordinal Bitterness scale |
|---|---|---|
| 9 | I like extremely | None |
| 8 | I like very much | Slight |
| 7 | I like moderately | Slight |
| 6 | I like slightly | Moderate |
| 5 | I neither like nor dislike | Moderate |
| 4 | I dislike slightly | Strong |
| 3 | I dislike moderately | Strong |
| 2 | I dislike very much | Extreme |
| 1 | I dislike extremely | Extreme |

The results of the testing are shown in Table 2. Purees made from chicory root were found to be disliked extremely and also to be extremely bitter. Surprisingly, purees of burdock root, salsify root and Jerusalem artichoke tuber were found to be less bitter than carrot, a moderately bitter root vegetable used extensively in baby food products. Purees of salsify root and burdock root have unique flavors not found in current baby foods, so they received poor flavor scores from the panelists.

TABLE 2

| | Flavor | Mouthfeel/Texture | Bitterness |
|---|---|---|---|
| J. artichoke (TK912) | 5.78 | 7.11 | 8.56 |
| Salsify root (TK965) | 3.78 | 5.33 | 6.78 |
| Parsley root | 3.44 | 6.22 | 6.67 |
| Burdock root (TK971) | 3.00 | 3.78 | 6.11 |
| White carrots | 4.00 | 6.78 | 5.78 |
| Unspent chicory (TK921A) | 1.36 | 5.36 | 2.18 |
| Spent chicory (TK921B) | 1.09 | 5.55 | 1.45 |

Statistical analysis was performed on the bitterness test as follows. Thirteen judges evaluated 2, 5 or 7 vegetables on a scale from 1 to 9 with 1 being the most bitter. An unbalanced, incomplete block design was used to evaluated the bitterness of the seven root vegetables. Analysis of variance accounting for the blocking by judges was used to determine differences in bitterness among vegetables. Least-squares means are reported to account for the imbalance across judges. Least-squares means are separated by Bonferonni's t-tests at an experimentwise alpha level of 0.05. A second analysis was run using only those judges that evaluated all 7 vegetables. This analysis was run parametrically by analysis of variance for a completely balanced randomized block design and non-parametrically by Friedman's test. The non-parametric analysis assumes that each judge is able to rank the vegetables according to bitterness but that the actual score is not meaningful. The scale for the ranked scores is from 1 to 7 rather than 1 to 9.

Means, standard deviations and standard errors are reported in Tables 3A and 3B. Least-squares means also are reported for the unbalanced data set using evaluations from all judges.

TABLE 3A

All Judges.

| Vegetable | NMean | LSMean* | SD | SE |
|---|---|---|---|---|
| Salsify | 96.78 | 6.75ab | 2.54 | 0.85 |
| Parsley | 96.67 | 6.64ab | 2.18 | 0.73 |
| Burdock | 96.11 | 6.08b | 3.10 | 1.03 |
| Carrots | 95.78 | 5.75b | 2.33 | 0.78 |
| Chicory-un | 112.18 | 2.30c | 1.17 | 0.35 |
| Chicory-sp | 111.45 | 1.57c | 0.52 | 0.16 |

*Means that are followed by the same letter do not differ significantly ($p < 0.05$).

TABLE 3B

Judges Who Evaluated All Vegetables.

| | | Hedonic scores | | | Ranked scores | | |
|---|---|---|---|---|---|---|---|
| Vegetable | N | Mean* | SD | SE | Mean* | SD | SE |
| Artichoke | 7 | 8.57a | 0.79 | 0.30 | 6.43a | 0.67 | 0.25 |
| Parsley | 7 | 6.86ab | 1.77 | 0.67 | 5.29ab | 1.11 | 0.42 |
| Salsify | 7 | 6.29b | 2.69 | 1.02 | 4.07b | 1.40 | 0.53 |
| Carrots | 7 | 5.86b | 2.54 | 0.96 | 4.71b | 0.95 | 0.36 |
| Burdock | 7 | 5.43b | 3.21 | 1.21 | 4.00b | 1.58 | 0.60 |
| Chicory-un | 7 | 2.00c | 1.29 | 0.49 | 2.00c | 0.71 | 0.27 |
| Chicory-sp | 7 | 1.57c | 0.53 | 0.20 | 1.50c | 0.58 | 0.22 |

*Means that are followed by the same letter do not differ significantly ($p < 0.05$).

The variability among judges within vegetables was somewhat higher than expected for a trained panel. Nevertheless, a significant ($p<0.0001$) difference for bitterness was found among vegetable types. The results were similar by all three methods of analysis. Both chicory variations were significantly more bitter than any of the other vegetables but did not differ from each other. The ordering of bitterness for salsify, parsley, burdock and carrots differed in each analysis but no significant differences were found among these four vegetables by any of the methods. Artichoke was scored as the least bitter of the vegetables by all types of analyses. When the data from all judges was included, artichokes were significantly less bitter than burdock, carrots and the 2 chicory variations. When only the 7 judges who saw all 7 vegetables were included, artichokes were significantly less bitter than salsify, carrots, burdock and the 2 chicory variations.

EXAMPLE 8

This example illustrates a testing procedure that could be used to determine the organoleptic acceptability of baby food composition to infants.

Informed consent would be obtained from the parents of the infants involved in the study. Testing would be in a double-blind, randomized controlled study. Approximately 10 full-term infants of ages from about 4 months to about 12 months would be fed a series of baby food composition prepared with a particular fructan-containing vegetable or a baby food composition that includes a control composition which is a standard vegetable normally used in baby food preparations and known to be accepted by the infants such as, for example, carrots. This control composition will serve as a reference for organoleptic acceptability. The baby food compositions can be prepared, for example, by the methods identified above in Examples 1–6. Analysis would be performed on the composition being tested to determine the total proteins, total carbohydrates, total fat as well as content of fructans in each composition.

General data on the infants would be obtained such as age and weight would be recorded. In addition, background information would be obtained from the parent which would generally identify food preferences or aversions as well as eating habits of the family of the test infant. Subjects would be randomly assigned to one of the two feeding groups. The test would involve feeding of the infant by the adult parent. The parent would record the acceptability and tolerance of the infant toward the baby food including amount offered, amount consumed and amount refused by the babies as well as the number, color and consistency of stools. All digestive problems, such as vomiting, spitting up, and diarrhea would be noted.

Acceptability would be scored by the mothers in a questionnaire which uses a nine-point hedonic scale as illustrated in example 6 above (see also Stone and Sidel, *Sensory Evaluation Practices*, Academic Press, Inc., Orlando, 1985, pp. 58–86 which is incorporated by reference). The mothers would indicate acceptance or aversion based on the responses of the infants to the food. The results would then be analyzed and vegetable compositions showing acceptance comparable to or greater than that of the standard vegetable would be considered suitable for use as an infant food.

EXAMPLE 9

The following example illustrates a testing procedure that could be used to evaluate fructan-containing baby food compositions for bifidogenic effect on infant fecal samples.

After obtaining informed consent for parents of babies to be studied in the test, a double-blind, randomized controlled study would be performed. two groups each including about 10 full-term infants of ages from about 4 months to about 12 months would be fed either a baby food composition which does not include a fructan-containing vegetable or a baby food composition that includes the fructan-containing vegetable. The baby food compositions can be prepared, for example, by the methods identified above in Examples 1–4 and Example 6. Analysis would be performed on the composition being tested to determine the total proteins, total carbohydrates, total fat as well as content of fructans in the composition. Such assays involve routine testing using methods known in the art.

General data on the infants would be obtained such as age, weight, length and head circumference would be recorded. Subjects would be randomly assigned to one of the two feeding groups. Feeding of the two groups would continue for a fixed period such as for example for one month. The adult feeding the infant would record acceptability and tolerance including amount offered, amount consumed and amount refused by the babies as well as the number, color and consistency of stools. All digestive problems, such as vomiting, spitting up, and diarrhea would be noted.

Testing of fecal samples would be done prior to the start of the feeding period, periodically during the testing period, for example, at 5 day intervals, and after the conclusion of the testing period. Testing would include determination of fecal flora composition and stool pH using methodology known in the art (for example, Langhendries et al., *J Ped Bastroenterol Nutr* 21:177–181, 1995; Gibson et al., *Gastroenterol* 108:975–982, 1995; Holdeman et al, eds. *Anaerobic Laboratory Manual,* 4th ed. Blacksburg, Va.: VPI Anaerobe Laboratory, 1977; Munoa et al., *Appl Environ Microbiol* 54:1715–1718, 1988; Macfarlane et al, *J Appl Bacteriol* 66:407–417, 1989; Mevissen-Verhage et al, *J Clin Microbiol* 25:285–289, 1987 which are incorporated by reference). For example, fecal pH would be determined after suspension of fecal matter in a saline at a concentration of about 10%. Fecal samples for determination of microflora would be collected into sterile containers and anaerobic conditions using commercially available supplies (for example, Anaerocult R-P Disposables, Merck, Darmstadt, F. R. G. which is incorporated by reference). Within approximately 1–5 hours after collection analysis would be performed on dilutions of fecal homogenates in sterile buffer solution. The suspensions would be inoculated on selective media for enumeration particular bacteria such as total anaerobes, total aerobes, coliforms, gram-positive cocci, bifidobacteria, bacteroides, fusobacteria, lactobacilli, and clostridia and plates would be incubated either aerobically or anaerobically. Individually colonies would be subcultured and bacteria characterized to genus level based upon colony appearance, gram reaction, spore production, cell morphology and fermentation end-product formation. Bifidobacteria would be further identified by the production of acetate and lactate as well as in fructose-6-phosphate phosphoketolase activity determined in appropriate medium.

Statistical analyses would then be performed on the resulting data comparing differences between the two groups.

EXAMPLE 10

This example illustrates a testing procedure that could be used to determine the beneficial effects on diaper rash following long term feeding the baby food compositions with fructan-containing vegetables.

After obtaining informed consent for parents of babies to be studied in the test, a double-blind, randomized controlled study would be performed. two groups each including about 10 full-term infants of ages from about 4 months to about 12 months would be fed either a baby food composition which does not include a fructan-containing vegetable or a baby food composition that includes the fructan-containing vegetable. The baby food compositions can be prepared, for example, by the methods identified above in Examples 1–6. Analysis would be performed on the composition being tested to determine the total proteins, total carbohydrates, total fat as well as content of fructans in the composition. Such assays involve routine testing using methods known in the art.

General data on the infants would be obtained such as age, weight, length and head circumference would be recorded. Subjects would be randomly assigned to one of the two feeding groups. The time duration within which the two baby food compositions would be included in the diets of the infants would be a fixed period such as, for example, for six months. The adult feeding the infant would record acceptability and tolerance including amount offered, amount consumed and amount refused by the babies as well as the number, color and consistency of stools. All digestive problems, such as vomiting, spitting up, and diarrhea would be noted.

Prior to the start of the testing period, infants would be examined by a physician and infants having diaper rash would be entered into the study. Fecal samples would be obtained and analyzed prior to the start of the feeding period, periodically during and after the conclusion of the test period as in Example 8.

During the course of the testing in which the baby food compositions would be included in the infant diet, the infants would be periodically examined by a physician. The presence and severity of diaper rash or other dermatologic pathology would be noted and recorded along with any other gastroenterologic abnormality. In addition, the general health of the infant would be assessed.

At the conclusion of the test, statistical analyses would then be performed on the resulting data comparing differences between the two groups.

In a subsequent study the effect of feeding the fructan-containing baby food compositions on preventing the appearance of diaper rash could be determined. This study would be performed as described above except that infants entered into the study would have no diaper rash or minimal diaper rash at the start of the feeding period.

EXAMPLE 11

The following example illustrates a method that would be useful for commercial production of a mixed vegetables baby food composition which includes a fructan-containing vegetable.

Mixed vegetables may be produced on a commercial basis using a salsify-containing formula as follows:

| Ingredient | Percentage by weight theoretical | Weight/batch |
| --- | --- | --- |
| carrots, frozen (adjusted to provide 12% total solids) | 33.3 | 1000 lb. |
| salsify, frozen | 26.7 | 800 lb. |
| green beans, frozen | 10.0 | 300 lb. |
| peas, frozen | 5.0 | 150 lb. |
| batch water, estimated | 5.5 | 165 lb. |
| water from steam injection, estimated | 19.5 | 585 lb. |
|  | 100% | 3000 lb. |

Peeled fresh carrots having a 12% total solids content may be substituted in the above formula for frozen carrots. Carrot puree may be substituted for frozen carrots. If carrot puree is substituted for frozen carrots, the weight of carrot puree added to the batch is variable, depending on the total solids of the carrot puree.

The following two-step method will be used in commercial production of a 3,000 lbs. batch. First, a vegetable puree is prepared using frozen carrots, frozen salsify, frozen green beans and frozen peas. In the second step, the vegetable puree is further processed to produce the baby food in commercial quantities.

Step One—Commercial Puree Production

One thousand lbs. of frozen white carrots, 800 lbs. of frozen salsify, 300 lbs. of frozen green beans and 150 lbs. of frozen peas are placed in a Fitzpatrick Comminutor, Model No. F-20, at medium speed and a temperature of 200° F.–210° F. (205° F. target). Approximately 450 lbs of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 11.00% is necessary, however, a target total solids of 11.00%–11.49% is desired.

Step Two—Commercial Manufacturing Procedures for the Product

The amount of vegetable puree used in commercial production and the amount of batch water varies based on the total solids content in the vegetable puree. The amount of vegetable puree and batch water is selected based on the following adjustment table.

TABLE NO. 17

Vegetable Puree/Batch Water Adjustment Table

| Total Solids in vegetable puree | Vegetable puree, lb. | Batch water, lb. | Salsify percentage in finished product |
| --- | --- | --- | --- |
| 11.00%–11.49% Target | 2865 | — | 26.7% |
| 11.50%–11.99% | 2745 | 120 | 25.6% |
| 12.00%–12.49% | 2635 | 230 | 24.6% |
| 12.50%–13.00% | 2530 | 335 | 23.6% |

Assuming a total solids content of 11.00%–11.49%, 2865 lbs. of vegetable puree is placed in a Koven Kettle, having a capacity of 3,000 lbs. of product. Using steam injection, the puree is cooked in the Koven Kettle at about 212° F. for about 10 minutes. Approximately 135 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Mixed Vegetables are then placed in glass jars and further processed in a conventional manner and as required by 21 C.F.R. §113.

Baby foods are produced in different forms, depending on the age of the intended consumer. For example, Beech-Nut Stage 1 products are intended to be consumed by babies from about three months of age. Beech-Nut Stage 2 products are intended to be consumed by babies from about six months of age. Beech-Nut Stage 2 products are strained and will pass through a 0.050 inch orifice. The product heretofore described is a Stage 2 product. Beech-Nut Stage 3 Junior products are intended to be consumed by babies from about nine months of age. Junior products have chunky components that will pass through a ⅜ inch screen.

What is claimed is:

1. A baby food composition comprising at least one fructan-containing vegetable in an amount suitable for providing at least 1% fructan (w/w) to said composition to selectively stimulate colonic bifidobacteria in a human infant upon ingestion of the composition, in an acceptable baby-food formulation.

2. The baby food composition of claim 1 wherein the amount of the vegetable is sufficient to provide from about 1 to about 10 percent (w/w) fructan in said composition.

3. The baby food composition of claim 2 wherein the fructan is inulin.

4. The baby food composition of claim 3 wherein the vegetable comprises a tuber or root of a member of the Compositae family.

5. The baby food composition of claim 4 wherein the vegetable is selected from the group consisting of Jerusalem Artichoke, Salsify, Burdock and combinations thereof.

6. The baby food composition of claim 5 wherein the vegetable is Salsify.

7. The baby food composition of claim 5 wherein the vegetable is Burdock.

8. The baby food composition of claim 1 which further comprises one or more vegetables other than the fructan-containing vegetable.

9. The baby food composition of claim 8 wherein the other vegetable is obtained from a vegetable plant selected from the group consisting of a member of the buckwheat family, a member of the Goosefoot family, a member of the Gourd family, a member of the grass family, a member of the lily family, a member of the mallow family, a member of the morning glory family, a member of the mustard family, a member of the nightshade family, a member of the parsley family, a member of the legume family, and combinations thereof.

10. The baby food composition of claim 9 wherein the other vegetable plant is selected from the group consisting of buckwheat, rhubarb, sorrel, beets, spinach, Swiss chard, cantaloupe, casaba, cucumber honeydew, pumpkin, summer squash, winter squash, watermelon, barley, corn, hominy, millet, oat, rice, rye, sorghum, sugar cane, wheat, aloe, asparagus, chives, garlic, leek, onion, sarsaparilla, shallot, cottonseed, marshmallow, okra, sweet potato, broccoli, brussel sprouts, cabbage, cauliflower, collards, garden cress, horseradish, kale, kohlrabi, mustard, radish, rutabaga, turnip, watercress, bell pepper, cayenne pepper, paprika, eggplant, white potato, tomato, anise, caraway, carrot, celeriac, celery, coriander, dill, fennel, parsley, parsnip, acacia, alfalfa, black-eyed pea, broad bean, carob bean, chick pea, common beans, green beans, lentil, licorice, lima bean, mesquite, pea, peanut, tamarind, tragacanth, and combinations thereof.

11. A method for stimulating colonic bifidobacteria in an infant comprising feeding to the infant a baby food composition comprising at least one fructan-containing vegetable in an amount suitable for selectively providing at least 1% fructan (w/w) to said composition to maintain colonic bifidobacteria in the infant, in an acceptable baby-food formulation.

12. The method of claim 11 wherein the amount of the vegetable is sufficient to provide from about 1 to about 10 percent (w/w) fructan in said composition.

13. The method of claim 12 wherein the fructan is inulin.

14. The method of claim 12 wherein the vegetable comprises a tuber or root of a member of the Compositae family.

15. The method of claim 14 wherein the vegetable is selected from the group consisting of Jerusalem Artichoke, Salsify, Burdock and combinations thereof.

16. The method of claim 15 wherein the vegetable is Salsify.

17. The method of claim 15 wherein the vegetable is Burdock.

18. The method of claim 11 wherein the baby food composition further comprises one or more vegetables other than the fructan-containing vegetable.

19. The method of claim 18 wherein the vegetable other than the fructan-containing vegetable is obtained from a vegetable plant selected from the group consisting of a member of the buckwheat family, a member of the Goosefoot family, a member of the Gourd family, a member of the grass family, a member of the lily family, a member of the mallow family, a member of the morning glory family, a member of the mustard family, a member of the nightshade family, a member of the parsley family, a member of the legume family, and combinations thereof.

20. The method of claim 19 wherein the vegetable plant other than the fructan-containing vegetable is selected from the group consisting of buckwheat, rhubarb, sorrel, beets, spinach, Swiss chard, cantaloupe, casaba, cucumber honeydew, pumpkin, summer squash, winter squash, watermelon, barley, corn, hominy, millet, oat, rice, rye, sorghum, sugar cane, wheat, aloe, asparagus, chives, garlic, leek, onion, sarsaparilla, shallot, cottonseed, marshmallow, okra, sweet potato, broccoli, brussel sprouts, cabbage, cauliflower, collards, garden cress, horseradish, kale, kohlrabi, mustard, radish, rutabaga, turnip, watercress, bell pepper, cayenne pepper, paprika, eggplant, white potato, tomato, anise, caraway, carrot, celeriac, celery, coriander, dill, fennel, parsley, parsnip, acacia, alfalfa, black-eyed pea, broad bean, carob bean, chick pea, common beans, green beans, lentil, licorice, lima bean, mesquite, pea, peanut, tamarind, tragacanth, and combinations thereof.

21. A method for preparing a baby food composition comprising pureeing at least one fructan-containing vegetable in an acceptable baby food formulation in, an amount suitable for providing at least 1% fructan (w/w) to the composition to selectively stimulate colonic bifidobacteria in a human infant upon ingestion of the composition.

22. The method of claim 21 wherein the amount of the vegetable is sufficient to provide from about 1 to about 10 percent (w/w) fructan in said composition.

23. The method of claim 22 wherein the fructan is inulin.

24. The method of claim 23 wherein the vegetable comprises a tuber of a member of the Compositae family.

25. The method of claim 24 wherein the vegetable is selected from the group consisting of Jerusalem Artichoke, Salsify, Burdock and combinations thereof.

26. The method of claim 25 wherein the vegetable is Salsify.

27. The method of claim 25 wherein the vegetable is Burdock.

28. The method of claim 21 wherein the baby food composition further comprises one or more vegetables other than the fructan-containing vegetable.

29. The method of claim 28 wherein the vegetable other than the fructan-containing vegetable is obtained from a vegetable plant selected from the group consisting of a member of the buckwheat family, a member of the Goosefoot family, a member of the Gourd family, a member of the grass family, a member of the lily family, a member of the mallow family, a member of the morning glory family, a member of the mustard family, a member of the nightshade family, a member of the parsley family, a member of the legume family, and combinations thereof.

30. The method of claim 29 wherein the vegetable plant other than the fructan-containing vegetable is selected from the group consisting of buckwheat, rhubarb, sorrel, beets, spinach, Swiss chard, cantaloupe, casaba, cucumber honeydew, pumpkin, summer squash, winter squash, watermelon, barley, corn, hominy, millet, oat, rice, rye, sorghum, sugar cane, wheat, aloe, asparagus, chives, garlic, leek, onion, sarsaparilla, shallot, cottonseed, marshmallow, okra, sweet potato, broccoli, brusselsprouts, cabbage, cauliflower, collards, garden cress, horseradish, kale, kohlrabi, mustard, radish, rutabaga, turnip, watercress, bell pepper, cayenne pepper, paprika, eggplant, white potato, tomato, anise, caraway, carrot, celeriac, celery, coriander, dill, fennel, parsley, parsnip, acacia, alfalfa, black-eyed pea, broad bean, carob bean, chick pea, common beans, green beans, lentil, licorice, lima bean, mesquite, pea, peanut, tamarind, tragacanth, and combinations thereof.

* * * * *